United States Patent Office 3,267,101
Patented August 16, 1966

3,267,101
DERIVATIVES OF PYRAZINE
Antony M. Akkerman, Geertruida C. Van Leeuwen, and Josephus F. Michels, Amsterdam, Netherlands, assignors to N.V. Nederlandsche Combinatie voor Chemische Industrie, Amsterdam, Netherlands, a limited-liability company of the Netherlands
No Drawing. Filed May 6, 1964, Ser. No. 365,512
Claims priority, application Netherlands, May 10, 1963, 292,633
9 Claims. (Cl. 260—250)

This invention relates to novel substituted dicarboxylic acid imides and to a method of preparing the same. More particularly, it is directed to dicarboxylic acid imides substituted by a 2-pyrazyl substituent, and having the formula:

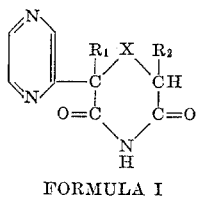

FORMULA I in which: $R_1$ is alkyl or cycloalkyl having up to seven carbon atoms, tertiary aminoalkyl having in its alkyl radical up to four carbon atoms, or aryl; $R_2$ is hydrogen or alkyl having at most four carbon atoms; X is a direct bond between two carbon atoms or methylene.

It has been found that the dicarboxylic acid imides of the above formula possesses hypnotic and/or anticonvulsive properties and, as such, the novel compounds are useful for preparing pharmaceuticals. They can be embodied in all forms suitable for therapeutic administration, such as tablets, dragées, pills, emulsions, injectable solutions, suppositories, and the like.

Preferred compounds among those represented by Formula I are those in which $R_1$ is selected from the group consisting of loweralkyl, diloweralkylaminoloweralkyl and phenyl, and $R_2$ is selected from the group consisting of hydrogen and methyl.

More particularly preferred compounds are those in which X is a direct bond between two carbon atoms, whereas the anti-convulsive properties are generally most pronounced in compounds in which $R_1$ represents phenyl.

The novel derivatives according to the invention can be prepared by methods which are known, as such, for the preparation of analogous compounds.

The most convenient method is that described by E. Tagmann et al., Helv. Chim. Acta, 35, 1235 and 1541 (1952) (see also U.S. Patent No. 2,673,205), for the preparation of imides which are substituted at one of the alpha positions by (hetero) aromatic radicals other than 2-pyrazyl. This known method consists essentially in cyclizing suitable substituted dicarboxylic acid derivatives.

In a manner analogous to the above, the compounds according to the invention can be conveniently prepared by cyclizing functional derivatives of alpha-pyrazyl dicarboxylic acids having the formula:

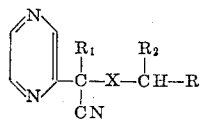

FORMULA II in which R is a carboxyl group or a substituent which can be hydrolysed into a carboxyl group, and $R_1$, $R_2$ and X have the above defined meanings, with the aid of a suitable condensing agent, preferably sulphuric acid, whether or not combined with glacial acetic acid.

The functional derivatives of alpha-pyrazyl dicarboxylic acids mentioned above can be prepared by reacting an alkali metal derivative of an alpha-substituted pyrazineacetonitrile having the formula:

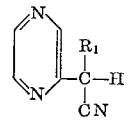

FORMULA III in which $R_1$ has the above defined meaning, with an halogencarboxylic acid derivative having the formula:

$$\text{Hal—X—CH—R}$$
$$\overset{|}{R_2}$$

FORMULA IV in which Hal is a halogen atom, and X, R and $R_2$ have the above defined meanings. When $R_1$ in Formula III stands for aryl, said alkali metal derivatives can be prepared with the aid of an alkali metal amide in a suitable solvent, such as, dioxane or liquid ammonia. If $R_1$ stands for alkyl, cycloalkyl or aminoalkyl, liquid ammonia is the preferred solvent.

Another suitable method for preparing the functional derivatives comprised in Formula II, consists in reacting an alpha-substituted pyrazineacetonitrile according to Formula III in a suitable solvent, for example, dioxane, and under the influence of a basic catalyst, with a convenient functional derivative of an alpha, beta unsaturated carboxylic acid. The basic catalysts that can be used are especially those of the quaternary ammonium base type, such as, that available commercially under the trademark Triton B and phenyltrimethylammoniumhydroxide.

Finally, the alpha-substituted pyrazine acetonitriles according to Formula III can be prepared, when $R_1$ represents aryl, by the method described in Dutch Patent No. 105,432 (German Patent No. 1,101,425, British Patent No. 893,391 and United States Patent No. 3,006,918), and when $R_1$ represents alkyl, cycoalkyl and/or aminoalkyl, by the method described in our co-pending application Serial No. 365,502 of even date herewith, which corresponds to Dutch patent application No. 292,632.

The following examples only serve to illustrate the methods by which the novel compounds according to the invention can be obtained, and it is not intended to restrict the invention to the compounds or methods specifically described.

*Example 1*

A mixture of 6.6 grams of alpha-isopropyl-alpha-pyrazyl-glutaronitrile, 6.6 cc. of sulphuric acid (78%) and 30 cc. of acetic acid is heated for four hours at 125° C. Then most of the acetic acid is removed by distillation under reduced pressure, after which the residue is poured onto ice. The solution obtained is neutralized with potassium hydrogen carbonate and the precipitate formed is separated. This precipitate, consisting of 4.5 grams of alpha-isopropyl-alpha-pyrazyl-glutarimide, is recrystallized from ethyl acetate yielding a colorless product which melts at 156–157° C.

*Example 2*

In the same way as described in Example 1, but starting from the alpha-ethyl- instead of from the alpha-isopropyl-derivative, alpha-ethyl-alpha-pyrazyl-glutarimide, melting at 95–96° C. is obtained. Yield 44%.

*Example 3*

In the same way as described in Example 1, but starting from the alpna-n.propyl- instead of from the alpha-isopropyl - derivative, alpha - n.propyl - alpha - pyrazyl-glutarimide, melting at 83–84° C. is obtained. Yield 51%.

Example 4

In the same way as described in Example 1, but starting from the alpha-n.butyl- instead of from the alpha-isopropyl - derivative, alpha - n.butyl - alpha - pyrazyl-glutarimide, melting at 93–94° C. is obtained. Yield 47%.

Example 5

In the same way as described in Example 1, but starting from the alpha-phenyl- instead of from the alpha-isopropyl - derivative, alpha - phenyl - alpha - pyrazyl-glutarimide, melting at 196–198° C. is obtained. Yield 75%.

Example 6

In the same way as described in Example 1, but starting from the alpha-(2-diethylaminoethyl)- instead of from the alpha-isopropyl-derivative, alpha-(2-diethylaminoethyl)-alpha-pyrazyl-glutarimide, melting at 123–124° C. is obtained. Yield 36%.

Example 7

In the same way as described in Example 1, but now starting from alpha - methyl - alpha' - n.propyl - alpha'-pyrazyl - glutaronitrile, alpha - methyl - alpha' - n.propyl-alpha'pyrazyl-glutarimide, melting at 107–109° C. is obtained. Yield 52%.

Example 8

In the same way as described in Example 1, but now starting from alpha - ethyl - alpha-pyrazyl-succinonitrile, alpha-ethyl-alpha-pyrazyl-succinimide, melting at 85–86° C. is obtained. Yield 41%.

Example 9

In the same way as described in Example 1, but now starting from alpha-n.propyl-alpha-pyrazyl-succinonitrile, alpha-n.propyl-alpha-pyrazyl-succinimide, meltaing at 72–74° C. is obtained. Yield 25%.

Example 10

In the same way as described in Example 1, but now starting from alpha - isopropyl-alpha-pyrazyl-succinonitrile, alpha-isopropyl-alpha-pyrazyl-succinimide, melting at 65° C. is obtained. Yield 44%.

Example 11

In the same way as described in Example 1, but now starting from alpha-phenyl-alpha-pyrazyl-succinonitrile, alpha-phenyl-alpha-pyrazyl-succinimide, melting at 100–105° C. is obtained. Yield 14%.

Example 12

A mixture of 19.5 grams (0.05 mole) of alpha-phenyl-pyrazineacetonitrile, 100 cc. of dioxane and 5.9 grams (0.15 mole) of sodium amide is stirred and boiled under reflux for two hours. After cooling to room temperature, to the red reaction-mixture are added dropwise 11.4 grams (0.15 mole) of chloroacetonitrile. The mixture obtained is stirred for one hour at room temperature and for another hour at the boiling point of dioxane. After cooling, 15 cc. of methanol are added and the whole mixture is poured into 1.5 liters of water.

The solution is extracted three times with chloroform and the extract is dried over magnesium sulphate. Then, the solvent is removed by distillation under reduced pressure. The remaining oil is distilled under 0.04 mm. of mercury, yielding 10.6 grams of alpha-phenyl-alpha-pyrazyl-succinonitrile boiling at 165° C. The compound is crystallized from petroleum ether. Melting point 85–87° C.

The cyanomethylation reaction described in this example can also be performed in liquid ammonia, giving similar results. The reactions described in the following Examples 13–15, however, are preferably performed in liquid ammonia.

Example 13

In the same way as described in Example 12, but starting from alpha-ethyl-pyrazineacetonitrile instead of from the alpha-phenyl derivative, alpha-ethyl-alpha-pyrazyl-succinonitrile (B.P.$_{0.4}$ 130° C. and M.P. 46–52° C.) is obtained.

Example 14

In the same way as described in Example 12, but starting from alpha-n.propyl-pyrazineacetonitrile instead of from the alpha-phenyl derivative, alpha-n.propyl-alpha-pyrazyl-succinonitrile (B.P.$_{0.5}$ 140° C.) is obtained.

Example 15

In the same way as described in Example 12, but starting from alpha-isopropyl-pyrazineacetonitrile, instead of from the alpha-phenyl derivative, alpha-isopropyl-alpha-pyrazyl-succinonitrile (B.P.$_{0.3}$ 130° C.) is obtained.

Example 16

To a solution of 6 grams of alpha-isopropyl-pyrazineacetonitrile in 30 cc. of dioxane are added with stirring and at a temperature of 80° C., 0.8 cc. of Triton B (40%) and thereupon 7.5 cc. of acrylonitrile dropwise at such a rate that the temperature remains between 85° and 90° C. After the addition has been completed, stirring at the same temperature is continued for two hours.

After cooling, 200 cc. of ether are added, and the solution obtained is washed with water and dried over magnesium sulphate. The solvent is removed by distillation under reduced pressure and the residue is fractionated in vacuo, yielding 6.7 grams of alpha-isopropyl-alpha-pyrazyl-glutaronitrile (B.P.$_{0.5}$ 143–144° C.; $n_D^{22}$ 1.5170).

Example 17

In the same way as described in Example 16, but starting from alpha-ethyl-pyrazineacetonitrile instead of from the alpha-isopropyl derivative, alpha-ethyl-alpha-pyrazyl-glutaronitrile is obtained (B.P.$_{0.2}$ 140–143° C.; $n_D^{21}$ 1.5161).

Example 18

In the same way as described in Example 16, but starting from alpha-n.propyl-pyrazineacetonitrile instead of from the alpha-isopropyl derivative, alpha-n.propyl-alpha pyrazyl-glutaronitrile is obtained (B.P.$_{0.2}$ 134–141° C.; $n_D^{22}$ 1.5102).

Example 19

In the same way as described in Example 16, but starting from alpha-n.butyl-pyrazineacetonitrile instead of from the alpha isopropyl derivative, alpha-n.butyl-alpha-pyrazylglutaronitrile is obtained (B.P.$_{0.4}$ 155–157° C.).

Example 20

In the same way as described in Example 16, but starting from alpha-phenyl-pyrazineacetonitrile instead of from the alpha-isopropyl derivative, alpha-phenyl-alpha-pyrazylglutaronitrile, melting at 180–181° C. is obtained.

Example 21

In the same way as described in Example 16, but starting from alpha-(2-diethylaminoethyl)-pyrazineacetonitrile instead of from the alpha-isopropyl derivative, alpha-(2-diethylaminoethyl)-alpha-pyrazyl-glutaronitrile is obtained (B.P.$_{0.3}$ 110.5–112° C.; $n_D^{20}$ 1.5050).

Example 22

In the same way as described in Example 16, but starting from alpha-n.propyl-pyrazineacetonitrile instead of from the alpha-isopropyl derivative, and using methacrylonitrile instead of acrylonitrile, alpha-methyl-alpha'-n.propyl-alpha'-pyrazyl-glutaronitrile is obtained (B.P.$_{0.5}$ 142–146° C.).

*Example 23*

In the same way as described in Example 16, but starting from alpha-phenyl-pyrazineacetonitrile instead of from the alpha-isopropyl derivative and using ethyl acrylate instead of acrylonitrile, alpha-(2-carbethoxyethyl)-alpha-phenyl-pyrazineacetonitrile is obtained (B.P.$_{0.5}$ 172° C.; M.P. 47–49° C.).

What is claimed is:

1. A compound represented by the formula:

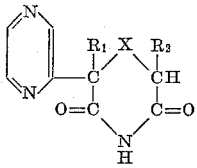

in which: $R_1$ is selected from the group consisting of loweralkyl, diloweralkylaminoloweralkyl and phenyl; $R_2$ is selected from the group consisting of hydrogen and methyl; and X is selected from the group consisting of a direct bond between two carbon atoms, and methylene.

2. A compound according to claim 1, in which $R_1$ represents phenyl.

3. Alpha-phenyl-alpha-pyrazyl-succinimide.

4. A method of preparing compounds of the formula:

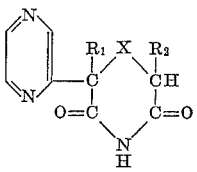

in which $R_1$ is selected from the group consisting of loweralkyl, diloweralkylaminoloweralkyl and phenyl; $R_2$ is selected from the group consisting of hydrogen and methyl; and X is selected from the group consisting of a direct bond between two carbon atoms, and methylene: comprising the step of heating with a strong inorganic acid an alpha-pyrazyl dicarboxylic acid of the formula:

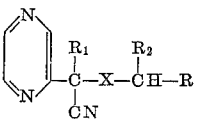

in which R is selected from the class consisting of a carboxyl group and substituents which can be hydrolysed into a carboxyl group, and $R_1$, $R_2$ and X have the above defined meanings.

5. Method according to claim 4, in which the strong inorganic acid is sulphuric acid.

6. Method according to claim 4, in which the strong inorganic acid is sulphuric acid and the reaction is performed in glacial acetic acid.

7. A compound represented by the formula:

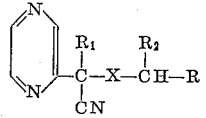

in which R is selected from the class consisting of a carboxyl group and substituents which can be hydrolysed into a carboxyl group; $R_1$ is selected from the group consisting of loweralkyl, diloweralkylaminoloweralkyl and phenyl; $R_2$ is selected from the group consisting of hydrogen and methyl; and X is selected from the group consisting of a direct bond between two carbon atoms, and methylene.

8. Alpha-phenyl-alpha-pyrazyl-succinonitrile.

9. A method of preparing compounds of the formula:

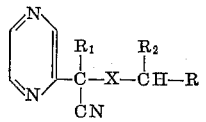

in which R is selected from the class consisting of a carboxyl group and substituents which can be hydrolysed into a carboxyl group; $R_1$ is selected from the group consisting of loweralkyl, diloweralkylaminoloweralkyl and phenyl; $R_2$ is selected from the group consisting of hydrogen and methyl; X is selected from the group consisting of a direct bond between two carbon atoms, and methylene: comprising the step of reacting an alkali metal derivative of an alpha-substituted pyrazineacetonitrile of the formula:

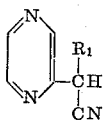

in which $R_1$ has the above defined meaning, with a halogen-carboxylic acid of the formula:

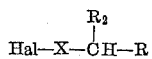

in which Hal represents a halogen atom, and R, $R_2$ and X have the above defined meanings.

No references cited.

NICHOLAS S. RIZZO, *Primary Examiner.*